(12) United States Patent
Steely, Jr. et al.

(10) Patent No.: US 9,037,804 B2
(45) Date of Patent: May 19, 2015

(54) EFFICIENT SUPPORT OF SPARSE DATA STRUCTURE ACCESS

(75) Inventors: Simon C. Steely, Jr., Hudson, NH (US);
William C. Hasenplaugh, Boston, MA (US); Joel S. Emer, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 13/995,209

(22) PCT Filed: Dec. 29, 2011

(86) PCT No.: PCT/US2011/067839
§ 371 (c)(1),
(2), (4) Date: Jun. 18, 2013

(87) PCT Pub. No.: WO2013/101060
PCT Pub. Date: Jul. 4, 2013

(65) Prior Publication Data
US 2013/0297883 A1    Nov. 7, 2013

(51) Int. Cl.
*G06F 13/00*  (2006.01)
*G06F 12/08*  (2006.01)

(52) U.S. Cl.
CPC ........ *G06F 12/0891* (2013.01); *G06F 12/0895* (2013.01)

(58) Field of Classification Search
USPC ......... 711/133, 145, 154, 163; 710/34, 57, 68
See application file for complete search history.

(56) References Cited

U.S. PATENT DOCUMENTS

| | | | |
|---|---|---|---|
| 7,552,277 B2 | 6/2009 | Rivers | |
| 2002/0091892 A1 | 7/2002 | Vondran | |
| 2003/0191902 A1* | 10/2003 | Snyder et al. | 711/144 |
| 2004/0181626 A1* | 9/2004 | Pickett | 711/3 |
| 2007/0283101 A1* | 12/2007 | El-Essawy et al. | 711/137 |
| 2008/0270745 A1* | 10/2008 | Saha et al. | 712/1 |
| 2010/0064107 A1 | 3/2010 | Eddy et al. | |
| 2011/0202731 A1 | 8/2011 | Ohmacht | |
| 2011/0302561 A1* | 12/2011 | Dayan et al. | 717/128 |

OTHER PUBLICATIONS

International Search Report and Written Opinion issued on Apr. 27, 2012, for counterpart International Application No. PCT/US2011/67839.

* cited by examiner

*Primary Examiner* — Reba I Elmore
(74) *Attorney, Agent, or Firm* — Kenyon & Kenyon, LLP

(57) ABSTRACT

Method and apparatus to efficiently organize data in caches by storing/accessing data of varying sizes in cache lines. A value may be assigned to a field indicating the size of usable data stored in a cache line. If the field indicating the size of the usable data in the cache line indicates a size less than the maximum storage size, a value may be assigned to a field in the cache line indicating which subset of the data in the field to store data is usable data. A cache request may determine whether the size of the usable data in a cache line is equal to the maximum data storage size. If the size of the usable data in the cache line is equal to the maximum data storage size the entire stored data in the cache line may be returned.

13 Claims, 6 Drawing Sheets

EFFICIENT SUPPORT OF SPARSE DATA STRUCTURE ACCESS

FIELD OF THE INVENTION

The present disclosure pertains to the field of processors and, in particular, to optimizing cache management techniques.

DESCRIPTION OF RELATED ART

Advances in semi-conductor processing and logic design have permitted an increase in the amount of logic that may be present on integrated circuit devices. As a result, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors. The ever increasing number of processing elements—cores, hardware threads, and logical processors--on integrated circuits enables more tasks to be accomplished in parallel. However, the execution of more threads and tasks put an increased premium on shared resources, such as memory, and the management thereof.

Typically, cache memory includes a memory between a shared system memory and execution units of a processor to hold information in a closer proximity to the execution units. In addition, cache is typically smaller in size than a main system memory, which allows for the cache to be constructed from expensive, faster memory, such as Static Random Access Memory (SRAM). Both the proximity to the execution units and the speed allow for caches to provide faster access to data and instructions. Caches are often identified based on their proximity from execution units of a processor. For example, a first-level (L1) cache may be close to execution units residing on the same physical processor. Due to the proximity and placement, first level cache is often the smallest and quickest cache. A computer system may also hold higher-level or further out caches, such as a second level (L2) cache, which may also reside on the processor but be placed between the first level cache and main memory. And a third level (L3) cache may be placed on the processor or elsewhere in the computer system, such as at a controller hub, between the second level cache and main memory.

Caches are usually organized into cache lines with each line containing some number of bytes, and the size of each cache line in a cache is consistent. Similarly, the size of data held by each cache line in a cache is also consistent. The larger the size of the data in a cache line the more energy is required to store, access, and modify the data. Based on the organization of a cache, the amount of energy required may vary. Thus, there is a need for energy efficient ways to organize data within caches.

DESCRIPTION OF THE FIGURES

Embodiments are illustrated by way of example and not limitation in the Figures of the accompanying drawings.

DETAILED DESCRIPTION

Figure 1:
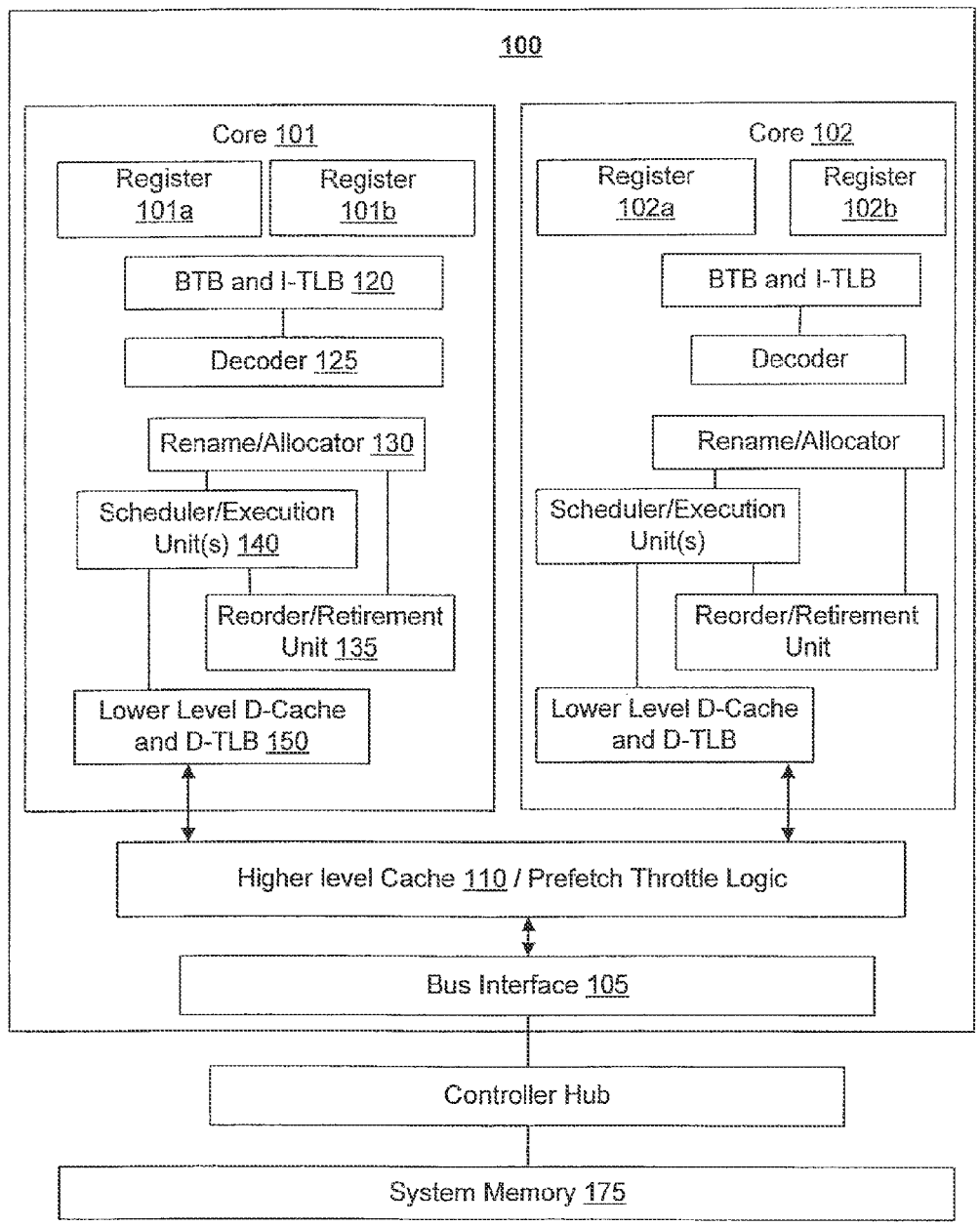
FIG. 1 illustrates an embodiment of a processor including multiple processing elements.

In the following description, numerous specific details are set forth such as examples of specific hardware structures for determining cache lines, reading/writing to cache lines, and determining target caches, as well as placement of such hardware structures, such as at memory ports or at independent cache slices; specific processor units/logic, specific examples of processing elements, etc. in order to provide a thorough understanding of the present invention. It will be apparent, however, to one skilled in the art that these specific details need not be employed to practice the present invention. In other instances, well known components or methods, such as specific counter circuits, alternative multi-core and multi-threaded processor architectures, specific un-core logic, specific memory controller logic, specific cache implementations, specific cache coherency protocols, and specific operational details of microprocessors, have not been described in detail in order to avoid unnecessarily obscuring the present invention.

Embodiments may be discussed herein to efficiently organize data in caches. In particular, embodiments of the present invention pertain to a feature for storing/accessing data of varying sizes in cache lines. In an embodiment, data may be stored in a field to store data. The field to store data may be part of a cache line in a cache, and may be confined to a maximum size. In an embodiment, a value may be assigned to a field indicating the size of usable data stored in a cache line. In an embodiment, if the field indicating the size of the usable data in the cache line indicates a size less than the maximum storage size, a value may be assigned to a field in the cache line indicating which subset of the data in the field to store data is usable data.

In an embodiment, the data in a cache line, or the value assigned to the field indicating the size of data stored in a cache line, or the value assigned to the field indicating which subset of the data in the field to store data is usable data may be read. In an embodiment, a cache request may determine whether the size of the usable data in a cache line is equal to the maximum data storage size. If the size of the usable data in the cache line is equal to the maximum data storage size the entire stored data in the cache line may be returned. In an embodiment, if the size of the usable data in a cache line is less than a maximum data storage size, the data in the cache line may be merged with associated data in memory, and the merged data may be stored in the cache line. The merged data's size may be equal to the maximum data storage size.

In an embodiment, a cache request may determine whether a usable data in a cache line is a particular subset of data. If the usable data in the cache line is not a particular subset of data, the data in the cache line may be merged with associated data in memory, and the merged data may be stored in the cache line. The merged data's size may be equal to the maximum data storage size.

In an embodiment, the maximum data storage size of a cache line may be 64 bytes. In an embodiment, the size of stored usable data in a cache line may be 4 bytes, 8 bytes, or 64 bytes.

Referring to FIG. 1, an embodiment of a processor including multiple cores is illustrated. Processor 100, in one embodiment, includes one or more caches. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core hopping may be utilized to alleviate thermal conditions on one part of a processor. However, hopping from core 101 to 102 may potentially create the same thermal conditions on core 102 that existed on core 101, while incurring the cost of a core hop. Therefore, in one embodiment, processor 100 includes any number of cores that may utilize core hopping. Furthermore, power management hardware included in processor 100 may be capable of placing individual units and/or cores into low power states to save power. Here, in one embodiment, processor 100 provides hardware to assist in low power state selection for these individual units and/or cores.

Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, processor 100 includes a branch target buffer 120 to predict branches to be executed/taken and an instruction-translation buffer (I-TLB) 120 to store address translation entries for instructions.

Processor 100 further includes decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

As depicted, cores 101 and 102 share access to higher-level or further-out cache 110, which is to cache recently fetched elements. Note that higher-level or furtherout refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

Note, in the depicted configuration that processor 100 also includes bus interface module 105 to communicate with devices external to processor 100, such as system memory 175, a chipset, a Northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

Figure 2:
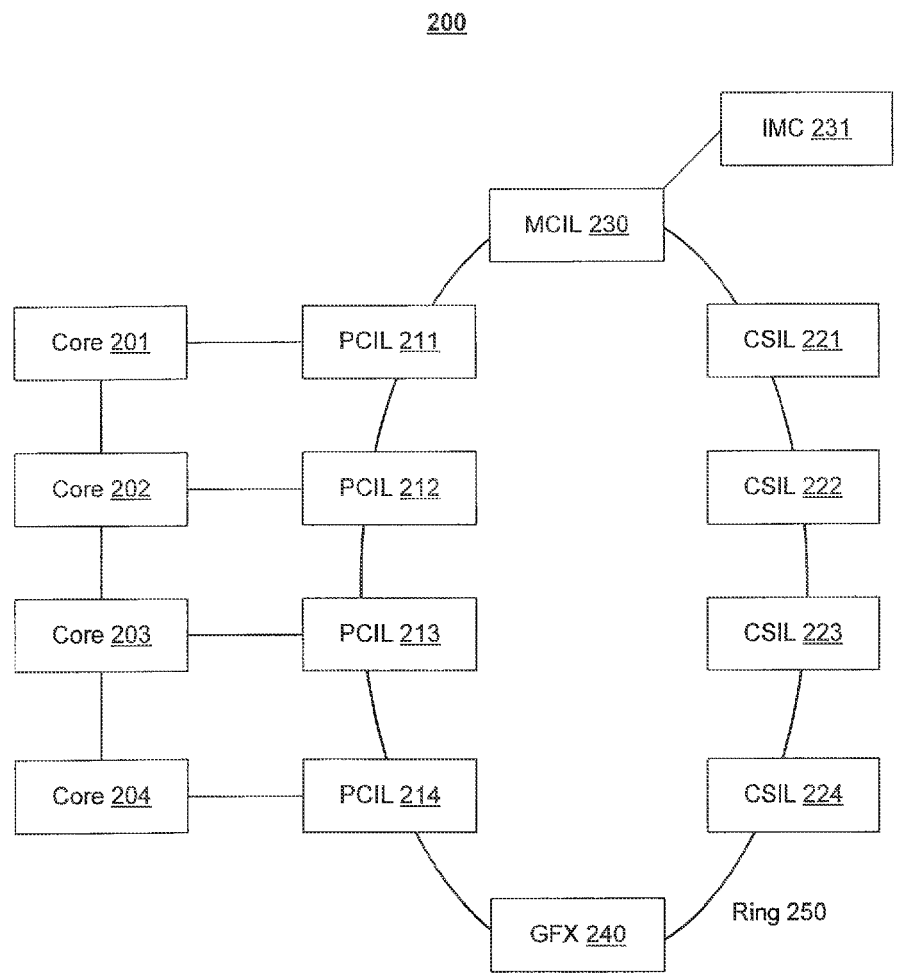
FIG. 2 illustrates an embodiment of on-core memory interface logic.

FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. To illustrate the potential for a different configuration, the discussion now turns to FIG. 2, which depicts an embodiment of processor 200 including an on-processor memory interface module—an un-core module—with a ring configuration to interconnect multiple cores. Processor 200 is illustrated including a physically distributed cache; a ring interconnect; as well as core, cache, and memory controller components. However, this depiction is purely illustrative, as a processor implementing the described methods and apparatus may include any processing elements, style or level of cache, and/or memory, front-side-bus or other interface to communicate with external devices.

In one embodiment, caching agents 221-224 are each to manage a slice of a physically distributed cache. As an example, each cache component, such as component 221, is to manage a slice of a cache for a collocated core—a core the cache agent is associated with for purpose of managing the distributed slice of the cache. As depicted, cache agents 221-224 are referred to as Cache Slice Interface Logic (CSIL)s; they may also be referred to as cache components, agents, or other known logic, units, or modules for interfacing with a cache or slice thereof. Note that the cache may be any level of cache; yet, for this exemplary embodiment, discussion focuses on a last-level cache (LLC) shared by cores 201-204.

Much like cache agents handle traffic on ring interconnect 250 and interface with cache slices, core agents/components 211-214 are to handle traffic and interface with cores 201-204, respectively. As depicted, core agents 221-224 are referred to as Processor Core Interface Logic (PCIL)s; they may also be referred to as core components, agents, or other known logic, units, or modules for interfacing with a processing element Additionally, ring 250 is shown as including Memory Controller Interface Logic (MCIL) 230 and Graphics Hub (GFX) 240 to interface with other modules, such as memory controller (IMC) 231 and a graphics processor (not illustrated). However, ring 250 may include or omit any of the aforementioned modules, as well as include other known processor modules that are not illustrated. Additionally, similar modules may be connected through other known interconnects, such as a point-to-point interconnect or a multi-drop interconnect.

It's important to note that the methods and apparatus' described herein may be implemented in any cache at any cache level, or at any processor or processor level. Furthermore, caches may be organized in any fashion, such as being a physically or logically, centralized or distributed cache. As a specific example, the cache may include a physical centralized cache with a similarly centralized tag directory, such as higher level cache 110. Alternatively, the tag directories may be either physically and/or logically distributed in a physically distributed cache, such as the cache organization illustrated in FIG. 2.

Figure 3A:
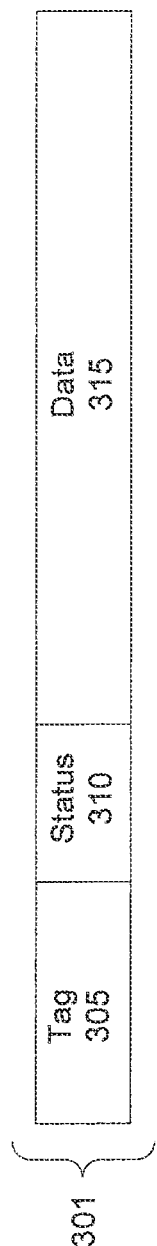
FIG. 3A illustrates a basic structure of a cache line in an embodiment.

A cache stores quantities of data called cache lines or cache blocks. The term cache line and cache block may be used interchangeably. FIG. 3A illustrates the basic structure of a cache line. A cache line 301 may be composed of two main parts: metadata (or tag) 305 and data 315. The tag entry 305 identifies the contents of the corresponding data entry 315. Status information 310 may include a validity bit indicating whether the data 315 in the cache line 301 is valid. The cache line 301, and its underlying parts or fields such as the data field 315 may be of any size. Typically, the size of cache lines are consistent in a cache structure, and the data size may be fixed at 64 bytes. When a request for a data item smaller than 64 bytes, for example an 8-byte data item, misses the cache, a new line is allocated and all 64 bytes of the line are returned and filled into the cache. This is because most programs have spatial locality and the other 56 bytes of the line have a good probability of being accessed. However, some data structures are accessed sparsely, and demonstrate no spatial locality. In these situations only the 8 bytes of the request need to be returned because the other 56 bytes will not be accessed and it is a waste of energy to move them around.

Figure 3B:
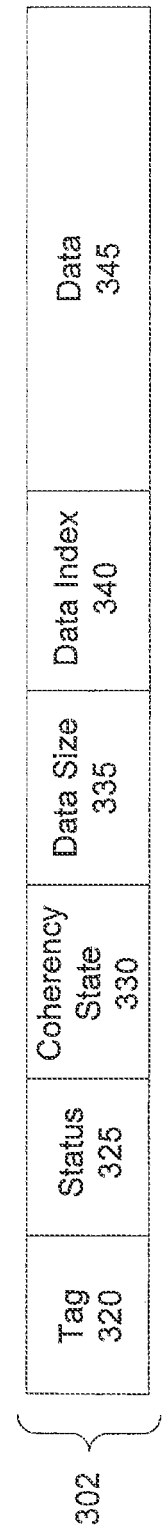
FIG. 3B illustrates a cache line structure in an embodiment.

FIG. 3B illustrates an embodiment of a cache structure with additional fields to address the wasted energy issue above. In addition to the fields, tag 320, status 325, and data 345, the cache line 302 includes a field 335 to indicate the size of data held in data field 345, and a field 340 to indicate which subset portion of data is held (i.e., field 340 indicates which portion of the data held in data field 345 is usable). For example, if the data field 345 can hold a maximum of 64 bytes of data, the data size field 335 may indicate that only 8 bytes out of the possible 64 bytes is stored in the corresponding cache line, and the data index field 340 may indicate that the third naturally aligned 8 bytes (i.e., bytes 17-24) of a 64-byte portion of data is stored in data field 345. In an embodiment when a request for a subset, for example 8 bytes, of data encounters a cache miss, the request may only retrieve the required 8 bytes of the requested data from memory, store the retrieved 8 bytes of data into an associated cache line, and then return the requested data. The next time the same 8-byte data is requested, the request realizes that the data is present in the cache, and retrieves only the requested 8 bytes of data, therefore saving energy by not having to move around 64 bytes of data for every operation.

In an embodiment, as seen in FIG. 3B, a cache entry 302 may include a field 330 to indicate the cache coherency state of the cache line. Cache coherence is a useful mechanism in multiple processor systems to provide a shared memory abstraction to the programmer. When multiple processors cache a given shared memory location, a cache coherence problem may arise because a copy of the same memory location exists in multiple caches. A cache coherence protocol guarantees that a given memory location has a consistent view across all processors. Cache coherence protocols may include MSI, MESI (Illinois protocol), MOSI, MOESI, MERSI, MESIF, write-once, Synapse, Berkeley, Firefly, and Dragon protocols. The coherency state field 330 may be associated with any of the states relevant to different cache coherence protocols.

Figure 4:
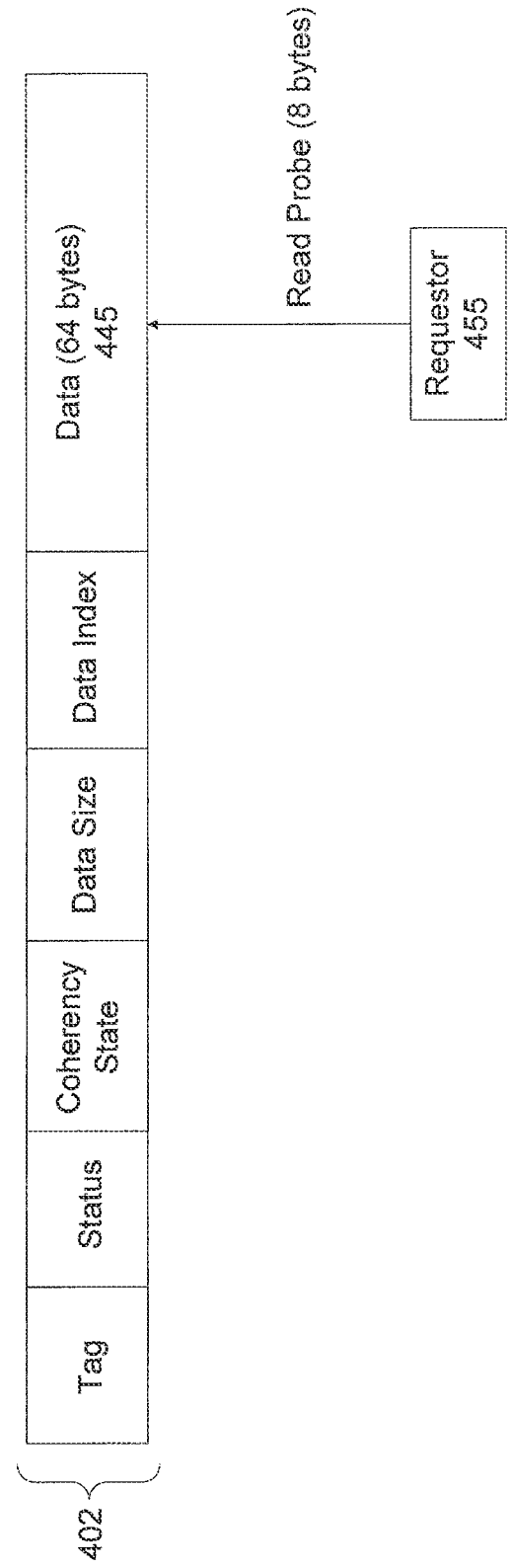
FIG. 4 illustrates an embodiment for retrieving/storing data in a cache.

FIG. 4 illustrates an embodiment for retrieving/storing data in a cache. A read probe may be sent by a requestor 455 for a subset of data in cache line 402, which has the capacity to hold data that is larger than the requested subset of data. The request may find that the data in cache line 402 is larger than the requested data, and therefore, the request may return with a fill of the entire data 445 in the cache line, and a portion of the returned data may contain the requested data. For example, a read probe may be sent by a requestor 455 for an 8-byte section of a cache line which is capable of holding 64 bytes of data. The request may find that the data in the cache line 402 is the full 64-byte version of the data 445, and therefore, the request may return with a 64-byte fill of the data, keeping the cache line in 64-byte mode.

Figure 5:
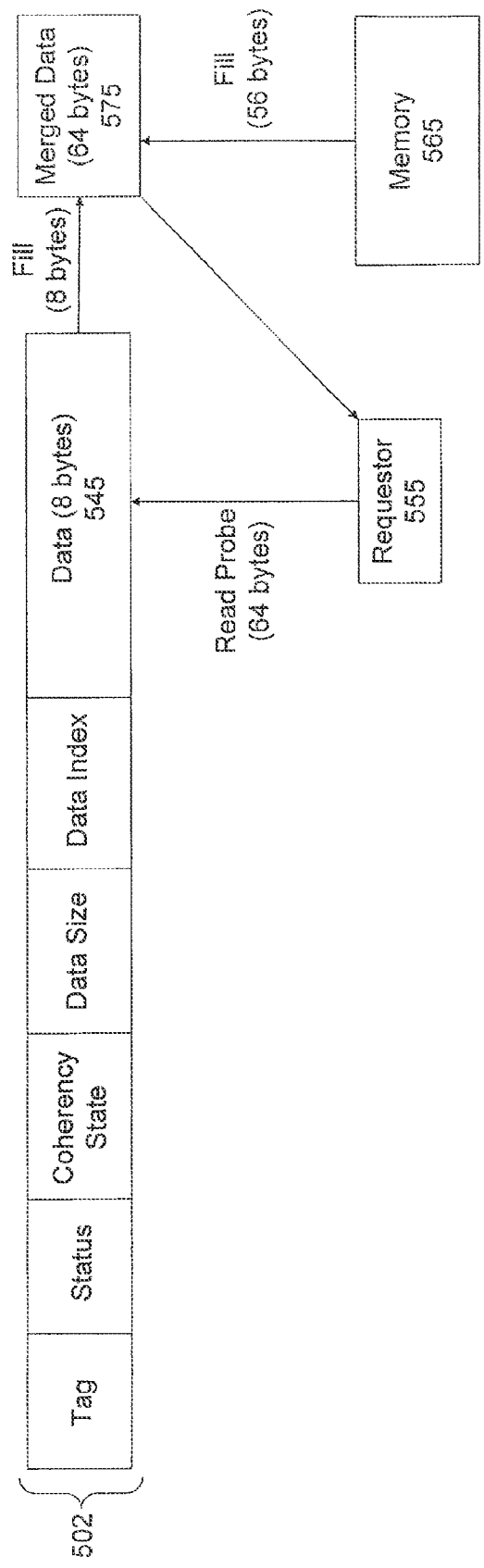
FIG. 5 illustrates an embodiment for retrieving/storing data in a cache.

FIG. 5 illustrates an embodiment for retrieving/storing data in a cache. A read probe may be sent by a requestor 555 for the entire data information in cache line 502. However, the cache line 502 may only contain a subset 545 of the requested data. Therefore, the subset data 545 may be merged with the missing portion of the requested data, which may be obtained from memory 565, and the merged data 575 may be returned to the requestor 555. In an embodiment, the subset data 545, and the missing portion of the data obtained from memory 565, may be returned to the requestor and the requestor may merge the data 575. The merged data may be stored in cache line 502. For example, a read probe may be sent by a requestor 555 for the entire 64 bytes of data in a cache line 502, but the read probe may find that the cache line currently only contains an 8-byte subset 545 of the requested data. Therefore, the 8-byte version of the line 545 and the other 56 bytes of the line obtained from memory 565, may be returned to the requestor 555 and merged 575.

Figure 6:
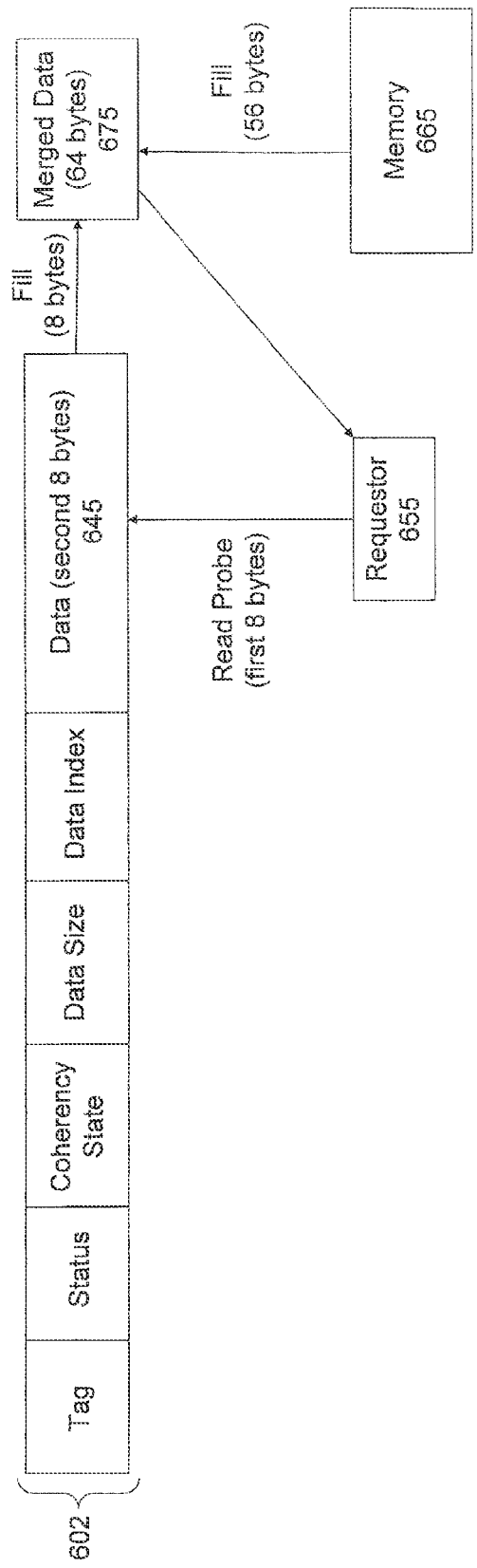
FIG. 6 illustrates an embodiment for retrieving/storing data in a cache.

FIG. 6 illustrates an embodiment for retrieving/storing data in a cache. A read probe may be sent by a requestor 655 for a subset of data in cache line 602. However, the cache line 602 may only contain a different subset 645 of data. Therefore, the subset of data in the cache line 645 may be merged with a missing portion of corresponding data, which may be obtained from memory 665, and the merged data 675 may be returned to the requestor 655. In an embodiment, the subset data 645, and the missing portion of the data obtained from memory 665, may be returned to the requestor and the requestor may merge the data 675. The merged data may be stored in cache line 602. For example, a read probe may be sent by a requestor 655 for the first 8 bytes of data from a cache line 602, but the read probe may find that the cache line currently only contains a different 8-byte subset of data 645. Therefore, the 8 bytes of data in the cache line 645 and the other 56 bytes of the line obtained from memory 665 may be returned to the requestor 655 and merged 675.

In the embodiments described, there are instances where the values 4 bytes and 8 bytes are used to describe the size of data subsets read/written. It should be evident that these values are not meant to restrict the invention, but are rather used for exemplary purposes. The size of subset data accessed in a cache line may be of any size. Similarly, there are instances where the value 64 bytes is used to describe the size of data in a cache line, and the maximum size of data. It should be evident that this value is not meant to restrict the invention, but is rather used for exemplary purposes. The size of data stored/accessed and the maximum size of data in a cache line may be of any size.

A value, as used herein, includes any known representation of a number, a state, a logical state, or a binary logical state. Often, the use of logic levels, logic values, or logical values is also referred to as 1s and 0s, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   at least one cache configured to store at least one cache line, wherein each cache line includes at least:
   a first field to store data, wherein the first field is confined to a maximum data storage size,
   a second field to indicate a size of usable data stored in the first field, and
   if the second field indicates a size less than the maximum data storage size, a third field to indicate which subset of the data in the first field is usable data.

2. The apparatus of claim 1, wherein if a request to a cache line for a subset of data determines that usable data in the cache line's first field is of a size equal to the maximum data storage size, the request returns the entire stored data in the cache line.

3. The apparatus of claim 1, wherein if a request to a cache line for data equal to the maximum data storage size determines that usable data in the cache line's first field is of a size less than the maximum data storage size, the usable data and associated data in memory are returned and merged, wherein the merged data's size is equal to the maximum data storage size.

4. The apparatus of claim 1, wherein if a request to a cache line for a subset of data determines that usable data in the cache line's first field is a different subset of data, the usable data and associated data in memory are returned and merged, wherein the merged data's size is equal to the maximum data storage size.

5. The apparatus of claim 1, wherein the maximum data storage size is 64 bytes, and the usable data's size is either 8 bytes or 64 bytes.

6. The apparatus of claim 1, wherein the maximum data storage size is 64 bytes, and the usable data's size is either 4 bytes or 64 bytes.

7. A method comprising:
  storing data in a first field to store data, wherein the first field is part of a cache line, the cache line belongs to a cache, and the first field is confined to a maximum data storage size;
  assigning a value to a second field to indicate a size of usable data stored in the first field, and
  if the second field indicates a size less than the maximum data storage size, assigning a value to a third field to indicate which subset of the data in the first field is usable data.

8. The method of claim 7, further comprising at least one of:
  reading the data stored in the first field, reading the value assigned to the second field, and reading the value assigned to the third field.

9. The method of claim 7, further comprising:
  determining whether the size of the usable data in the first field is equal to the maximum data storage size; and
  if the size of the usable data in the first field is equal to the maximum data storage size, returning the entire stored data in the cache line.

10. The method of claim 7, further comprising:
  determining whether the size of the usable data in the first field is equal to the maximum data storage size; and
  if the size of the usable data in the first field is less than the maximum data storage size, returning the usable data in the first field and associated data in memory, and then merging the returned data, wherein the merged data's size is equal to the maximum data storage size.

11. The method of claim 7, further comprising:
  determining whether usable data in the first field is a particular subset of data; and
  if the usable data is not the particular subset of data, returning the usable data in the first field and associated data in memory, and then merging the returned data, wherein the merged data's size is equal to the maximum data storage size.

12. The method of claim 7, wherein the maximum data storage size is 64 bytes, and the usable data's size is either 8 bytes or 64 bytes.

13. The method of claim 7, wherein the maximum data storage size is 64 bytes, and the usable data's size is either 4 bytes or 64 bytes.

* * * * *

UNITED STATES PATENT AND TRADEMARK OFFICE
CERTIFICATE OF CORRECTION

PATENT NO. : 9,037,804 B2
APPLICATION NO. : 13/995209
DATED : May 19, 2015
INVENTOR(S) : Simon C. Steely, Jr. et al.

Page 1 of 1

It is certified that error appears in the above-identified patent and that said Letters Patent is hereby corrected as shown below:

In the specification

After the title of the invention, please insert the following paragraph:

--This invention was made with U.S. Government support under contract number H98230-11-3-0011 awarded by the Department of Defense. The Government has certain rights in this invention.--

Signed and Sealed this
Twentieth Day of October, 2015

Michelle K. Lee
*Director of the United States Patent and Trademark Office*